Sept. 23, 1952 J. W. GOBLE 2,611,140
BEE FEEDER
Filed May 5, 1950
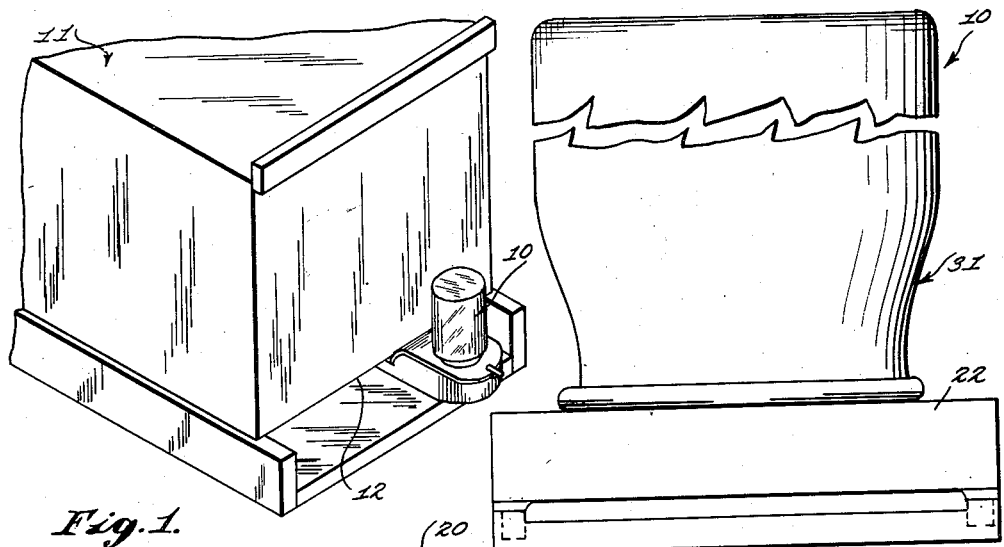
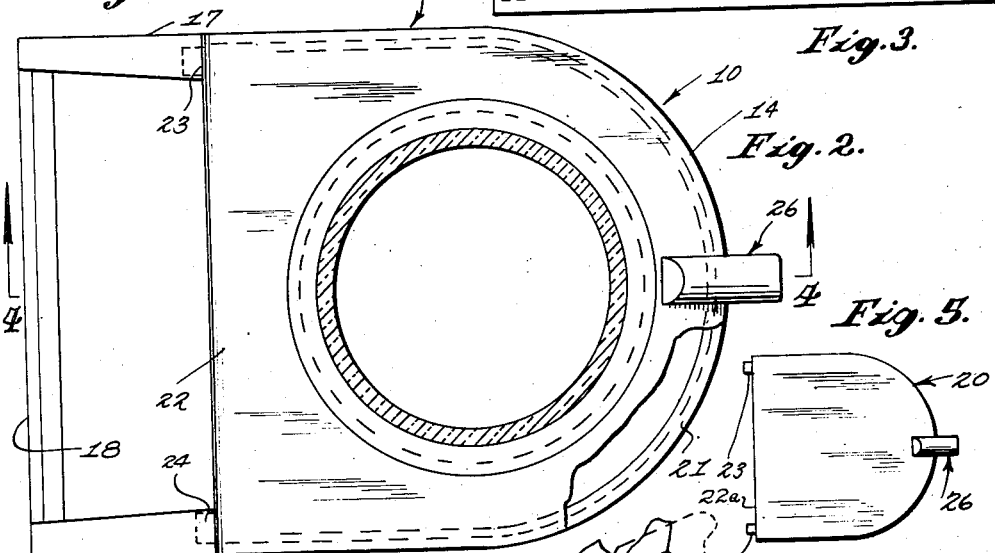
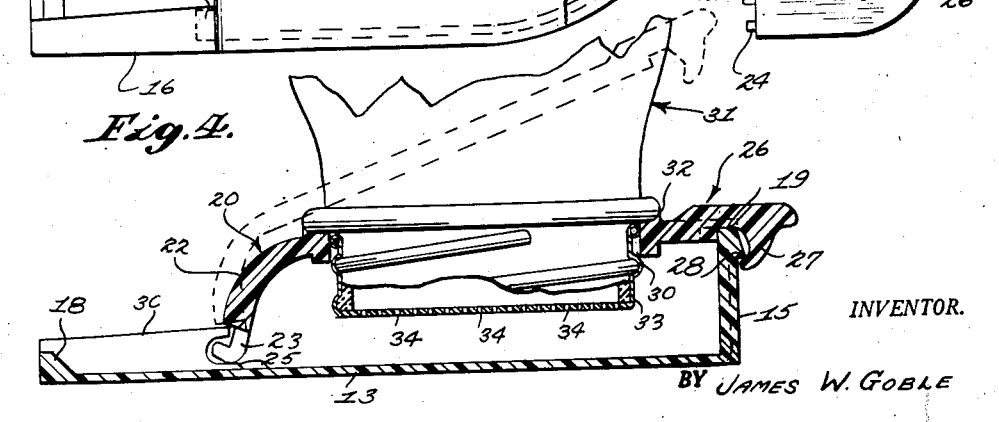
INVENTOR.
BY James W. Goble
McMorrow, Berman + Davidson
ATTORNEYS Patented Sept. 23, 1952

2,611,140

UNITED STATES PATENT OFFICE 2,611,140

BEE FEEDER

James W. Goble, Burbank, Calif.

Application May 5, 1950, Serial No. 160,133

2 Claims. (Cl. 6—5)

This invention relates to a bee feeding device.

An object of this invention is to provide a bee feeding device which is particularly adapted for use in the entrance of a beehive.

Another object of this invention is to provide a bee feeding device which is particularly adapted for feeding liquid and solid feed.

A further object of this invention is to provide a bee feeding device which may be readily disassembled for cleaning the interior thereof.

A still further object of this invention is to provide a bee feeding device which is simple in structure and cheap to manufacture.

Other objects of the invention will become apparent upon consulting the following specification in conjunction with the drawings.

In the drawings:

Figure 1 is a perspective view of the bee feeding device of the present invention as applied to the entrance of a beehive;

Figure 2 is an enlarged top plan view, with parts broken away and in section, of the bee feeding device of the present invention;

Figure 3 is an end elevational view of the bee feeding device, when viewed from the left of Figure 2;

Figure 4 is a sectional view taken along the line 4—4 of Figure 2;

Figure 5 is a top plan view of a modified form of closure lid for the bee feeding device of the present invention.

Referring now more particularly to the drawings, wherein like reference numerals have been used throughout the several views to designate like parts, there is shown the bee feeding device of the present invention, generally designated by the numeral 10, supported within the entrance 12 of the beehive 11.

The bee feeding device is fabricated of any suitable plastic material or the like, and includes an elongated, flat base 13 which rests upon the bottom of the beehive 11 within the entrance 12 contiguous to one side thereof, and has one end extending into and in communication with the interior of the beehive 11. The other end of the base 13 extends outwardly of the entrance 12 of the hive 11 and has its marginal edge arcuately cut away, as indicated at 14. Resting upon the outwardly projecting end of the base 13 and having its lower end fixedly secured to the marginal edge thereof is a vertically extending arcuate wall 15 which has its free ends terminating adjacent to and spaced from the interiorly projecting end of the base 13.

Extending inwardly from the interiorly projecting end of the base 13 in end-to-end confronting relation with respect to each of the free ends of the arcuate wall 15, and formed integrally with said free ends of the wall 15, are opposed, vertically extending flanges 16, 17 of substantially greater width than the arcuate wall 15. Each of the flanges 16, 17 has its lower end fixedly secured to the base 13, and has its upper end slightly tapering downwardly toward the end of the base contiguous thereto, as indicated at 30, to permit free insertion and withdrawal from the entrance 12 of the beehive 11.

Disposed transversely of the base 13 along the interiorly projecting end thereof is an abutment 18 which has its lower end fixedly secured to said base, and has its upper end terminating at a point spaced below the upper ends of the flanges 16, 17, to effectively maintain the base proof against moisture which may accumulate within the interior of the beehive 11.

The arcuate wall 15 is provided with a rim 19 on its upper end for the support thereon of a closure 20 which has one end shaped complementary to the arcuate wall 15, as indicated at 21, and has its other end bent downwardly, as indicated at 22, to overlie the abutting ends of the arcuate wall 15 and the flanges 16, 17, the end edge 22a of the downwardly bent other end 22 of the closure 20 being straight. Contiguous to the sides of the closure 20 and dependingly supported from the downwardly bent end thereof are a pair of lugs 23, 24 which have their free ends embracingly received and supported within opposed sockets 25 provided interiorly of the vertical flanges 16, 17, the portion of the edge 22a between the lugs 23, 24, extending between the ends of the flanges 16 and 17 which are connected to the wall 15. From the foregoing it is readily apparent that the base 13, the arcuate wall 15 the vertical flanges 16, 17, the abutment 18, and the closure 20 cooperate to form a chamber which is open contiguous to one end thereof to permit the influx of bees from the beehive 11. As illustrated by the broken lines of Figure 4, the closure 20 may be rocked about the lugs 23, 24 out of closing position resting upon the arcuate wall 15 to thereby permit ready access to the interior of the chamber. The rocking movement of the closure 20 is effected by a handle 26 projecting outwardly from the arcuately cut away end 21 of the closure 20 and secured thereto. The outwardly projecting end of the handle 26 is provided with a depending latch 27 which engages with a protruding keeper 28 carried by the arcuate wall 15 to normally maintain the closure 20 in its position upon the arcuate wall 15. It is to be noted that the rocking movement of the closure 20 may be effected while the bee feeder 10 is supported within the entrance 12 of the beehive 11, since the curved end 22 of the closure 20 is selected so that the curved end 22 will not interfere with the adjacent wall of the hive 11.

When it is desired to use the bee feeding device of the present invention in conjunction with liquid feeds, such as a syrup, the closure 20 is provided with a central aperture 30 for the insertion therethrough of the threaded open top of a receptacle 31. The closure 20 contiguous to the aperture 30 is provided with a seat 32 which engages the receptacle 31 adjacent to its open top and supports the receptacle in an upright position. Threadedly engaging the open top of the receptacle 31 is a lid 33 which is provided with a plurality of apertures 34 for the withdrawal therethrough of the contents of the receptacle 31. When using syrup as a feed, the viscosity maintains the syrup within the receptacle 31 until such time as the bees withdraw the syrup therefrom.

When it is desired to utilize the bee feeder of the present invention in conjunction with solid feeds, such as artificial pollen and solid candy cakes, a closure 20, as illustrated in Figure 5, is utilized. Solid feed is placed within the bee feeder 10, and the closure 20 is brought into its closing position, whereupon the bees have ready access to the feed, and the user can readily renew the feed supply or clean the interior of the bee feeding device.

Although only one embodiment of the bee feeding device of the present invention has been described and illustrated, numerous modifications may be made without departing from the spirit of the invention as set forth in the appended claims.

What I claim is:

1. In an entrance bee feeder, a base having one end adapted to extend into a beehive entrance, a wall extending about the marginal edge of said base inwardly from the other end thereof and terminating adjacent to and spaced from said one end of said base and secured to said base, opposed flanges extending inwardly from said one end of said base and terminating at and connected integrally to said wall, said flanges being tapered for partial insertion thereof in the beehive entrance to thereby dispose the ends of the flanges connected to said wall exteriorly of the beehive entrance, the ends of the flanges connected to said wall being aligned transversely of the base and being of a greater width than said wall, thus to form end faces upon said connected flange ends, the end faces having sockets formed therein, a closure resting upon said wall, and lugs carried at opposite sides of the closure and removably and pivotally engageable in the sockets for mounting the closure at a location in which, in the inserted position of the flanges, the closure is both swingable into and out of bridging relation with said wall, and is bodily removable from the wall.

2. In an entrance bee feeder, a base having one end adapted to extend into a beehive entrance, a vertical wall extending about the marginal edge of said base inwardly from the other end thereof and terminating adjacent to and spaced from said one end of said base and secured to said base, opposed vertical flanges extending inwardly from said one end of said base and terminating at and connected integrally to said wall, said flanges being of a height less than said wall and being tapered for partial insertion thereof into the beehive entrance to thereby dispose the ends of the flanges connected to said wall exteriorly of the beehive entrance, the ends of the flanges connected to said wall being aligned transversely of the base and being of a greater width than said wall, thus to form end faces upon said connected flange ends, the end faces having sockets formed therein, a closure resting upon said wall and having a straight edge extending between the connected flange ends, so as to be spaced from said entrance, the closure being curved downwardly adjacent said end edge thereof to the height of the flanges, and lugs carried by the closure at opposite ends of said end edge thereof, the lugs being removably and pivotally engageable in the sockets for mounting the closure at a location in which, in the inserted position of the flanges, the closure is both swingable into and out of bridging relation with said wall, and is bodily removably from the wall.

JAMES W. GOBLE.

REFERENCES CITED

The following references are of record in the file of this patent:

UNITED STATES PATENTS

| Number | Name | Date |
| --- | --- | --- |
| 1,056,266 | Danzenbaker | Mar. 18, 1913 |
| 1,426,701 | Achenbach | Aug. 22, 1922 |

OTHER REFERENCES

Root, Bee Supplies 1938, pages 55, A. I. Root Company, Medina, Ohio.